United States Patent
Davies

(10) Patent No.: US 10,718,293 B2
(45) Date of Patent: Jul. 21, 2020

(54) THRUST REVERSER ACTUATOR

(71) Applicant: Goodrich Actuation Systems Limited, West Midlands (GB)

(72) Inventor: Stephen Davies, Shrewsbury (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 387 days.

(21) Appl. No.: 15/481,046

(22) Filed: Apr. 6, 2017

(65) Prior Publication Data
US 2017/0292474 A1    Oct. 12, 2017

(30) Foreign Application Priority Data

Apr. 8, 2016 (EP) .................................. 16164568

(51) Int. Cl.
| | | |
|---|---|---|
| *F02K 1/76* | (2006.01) | |
| *F02K 1/72* | (2006.01) | |
| *F02K 1/62* | (2006.01) | |
| *F16H 25/22* | (2006.01) | |
| *F16H 25/20* | (2006.01) | |

(52) U.S. Cl.
CPC ............. *F02K 1/763* (2013.01); *F02K 1/625* (2013.01); *F02K 1/72* (2013.01); *F02K 1/766* (2013.01); *F05D 2260/57* (2013.01); *F05D 2270/62* (2013.01); *F05D 2270/64* (2013.01); *F05D 2270/65* (2013.01); *F16H 25/2204* (2013.01); *F16H 2025/209* (2013.01); *F16H 2025/2084* (2013.01); *Y02T 50/671* (2013.01)

(58) Field of Classification Search
CPC ............. F02K 1/763; F02K 1/625; F02K 1/72
See application file for complete search history.

(56) References Cited

U.S. PATENT DOCUMENTS

| | | |
|---|---|---|
| 3,203,269 A | 8/1965 | Perrine |
| 3,497,165 A | 2/1970 | Sutton et al. |
| 4,005,822 A | 2/1977 | Timms |
| | (Continued) | |

FOREIGN PATENT DOCUMENTS

GB        2446441        *   8/2008   .............  F01D 17/20

OTHER PUBLICATIONS

Extended European Search Report for International Application No. 16164568.4, dated Oct. 17, 2016, 7 pages.

*Primary Examiner* — Andrew H Nguyen
(74) *Attorney, Agent, or Firm* — Cantor Colburn LLP

(57) ABSTRACT

An actuator operable to drive a thrust reverser in a gas turbine engine, wherein the thrust reverser comprises first and second translatable sleeves. The actuator comprises a first actuating member moveable so as to translate the first sleeve and a second actuating member moveable so as to translate the second sleeve. The actuator further comprises an interlock arrangement operable in a locked mode in which the first actuating member and second actuating member are locked so as to move together and in an unlocked mode in which at least one of the first actuating member and second actuator member is free to move independently of the other. Operation of the actuator to open or close the thrust reverser comprises a first mode wherein the interlock arrangement is in the locked mode and a second mode wherein the interlock arrangement is in the unlocked mode.

16 Claims, 15 Drawing Sheets

(56) References Cited

U.S. PATENT DOCUMENTS

| | | | |
|---|---|---|---|
| 4,005,922 A * | 2/1977 | Burkhart | H01R 13/512 |
| | | | 439/465 |
| 5,826,823 A | 10/1998 | Lymons et al. | |
| 8,904,751 B2 | 12/2014 | Howarth et al. | |
| 2005/0040284 A1 * | 2/2005 | Christensen | F02K 1/763 |
| | | | 244/101 |
| 2010/0192715 A1 * | 8/2010 | Vauchel | F02K 1/763 |
| | | | 74/89.35 |
| 2012/0137654 A1 * | 6/2012 | Burgess | F02K 1/06 |
| | | | 60/204 |
| 2013/0067884 A1 | 3/2013 | Bhatt | |
| 2013/0186219 A1 | 7/2013 | Jones | |
| 2014/0245743 A1 | 9/2014 | Caruel et al. | |
| 2015/0308381 A1 | 10/2015 | Byrne | |

* cited by examiner

THRUST REVERSER ACTUATOR

FOREIGN PRIORITY

This application claims priority to European Patent Application No. 16164568.4 filed Apr. 8, 2016, the entire contents of which is incorporated herein by reference.

TECHNICAL FIELD

The present disclosure relates to an actuator for driving the components of a thrust reverser in a gas turbine engine, and particularly in a turbofan engine.

BACKGROUND

Gas turbine engines, which are often used to propel aircraft, typically comprise a core engine which is surrounded by a nacelle. A bypass air duct is formed between the core engine and the nacelle. Air which enters the gas turbine engine is driven by a fan assembly along the bypass duct and provides a forward thrust at the rear of the engine.

In certain situations, such as during landing, it is necessary to slow the speed of the aircraft down significantly. Whilst this can partially be achieved using air brakes which are often present on the wings of an aircraft, it is also necessary to provide a reverse thrust from the gas turbine engines in order to further reduce the speed of the aircraft. In order to divert some of the air which passes through the engine to provide a reverse thrust, a thrust reverser may be arranged in the nacelle surrounding the fan assembly. Electric thrust reverser actuation systems may operate using a clamshell (see e.g. U.S. Pat. No. 5,826,823), blocker door (see e.g. U.S. Pat. No. 9,181,898) or translating cowl arrangement.

In a translating cowl arrangement, for example as seen in U.S. Pat. No. 8,904,751, the thrust reverser typically comprises a translating cowl mounted to the nacelle, a cascade within the nacelle, and blocker doors. When reverse thrust is required the translating cowl is translated so as to expose the cascade and the blocker doors are moved into the bypass duct so as to direct airflow through the cascade and out of the nacelle. The cascade typically comprises vanes which direct the airflow against the direction of the air which enters the engine and this provides a reverse thrust.

In typical thrust reverser architectures the cascade is arranged in a fixed position in the nacelle. The translating cowl is often mechanically linked to the blocker doors such that when the translating cowl slides opens it pivots the blocker doors relative to the cascade and radially inward into the bypass duct, resulting in bypassed air within the duct being diverted from the duct through the cascade.

The applicant has realised that at least some thrust reverser designs can introduce efficiency losses in the turbine engine, especially during the production of forward thrust. When the blocker doors are moved by the motion of a translating cowl, even in a stowed position the blocker doors may partially protrude into the bypass air flow path and causes efficiency losses. The applicant is aware of a thrust reverser comprising a translating cowl and a separate translating cascade linked to the blocker doors, with the blocker doors stowed away and fully hidden from the bypass air flow path so that the bypass ducting becomes more streamlined with less drag losses in flight, thus reducing the efficiency losses of the engine.

The applicant has now recognised that it may be undesirable to provide separate drives for each of the components in such a thrust reverser to move them into position, i.e. for moving the translating cowl and the cascade separately.

The present disclosure seeks to provide an improved actuator for a thrust reverser, and a thrust reverser comprising such an actuator.

SUMMARY

According to the present disclosure there is provided an actuator operable to drive a thrust reverser in a gas turbine engine, the thrust reverser comprising a linear translating cowl structure contained within a nacelle surrounding the gas turbine engine, the linear translating cowl structure comprising a first sleeve and a second sleeve;

wherein the actuator comprises a first actuating member moveable so as to translate the first sleeve, and a second actuating member moveable so as to translate the second sleeve, between positions corresponding to the thrust reverser being open or closed;

the actuator further comprising an interlock arrangement operable in a locked mode in which the first actuating member and second actuating member are locked so as to move together and in an unlocked mode in which at least one of the first actuating member and second actuator member is free to move independently of the other;

wherein the first actuating member and second actuating member are further arranged such that operation of the actuator to open or close the thrust reverser comprises:

a first mode wherein the interlock arrangement is in the locked mode and the first and second actuating members are driven to move together along a first predetermined distance; and a second mode wherein the interlock arrangement is in the unlocked mode and either the first actuating member or the second actuating member is driven to move along a second predetermined distance independently of the other actuating member.

Thus it will be appreciated by those skilled in the art that according to this disclosure two separate sleeve components in a thrust reverser are moved using a single actuator. This actuator is therefore particularly advantageous as it removes the need for a duplex thrust reverser system which would comprise a set of actuators for each sleeve component. A typical nacelle adopting the architecture described in the background above, whereby there is a translating cowl and a translating cascade sleeve, would typically require eight actuators, an isolation control unit and dual direction control units. Whereas a nacelle using the same architecture but using an actuator according to the present disclosure would only require four actuators, an isolation control unit and a single direction control unit. The number of actuators required is therefore significantly reduced. This reduces the space required to house the actuators within the nacelle and has the further advantage that the overall weight of the gas turbine engine is reduced. This helps to further improve the efficiency of the engine.

In addition by providing two actuating members which are mechanically sequenced together as is the case with the present disclosure, this removes the requirement for intersleeve synchronisation as is the case where independent actuator sets are provided for each of the sleeves. Often when independent actuators are provided, if adequate synchronisation cannot be achieved with sufficient robustness an additional and separate mechanical sequencing linkage is provided which adds weight and complexity to the thrust reverser architecture. Using an actuator according to the present disclosure avoids this problem entirely.

It will be appreciated that an actuator according to the present disclosure can be driven according to standard drive techniques. In a set of examples the actuator is a hydraulic actuator. In such examples a synchronising reduction gearbox may be provided to enable mechanical synchronisation between actuators and further arranged so as to drive an ACME screw which acts to drive the first actuating member and/or the second actuating member. In an alternative set of examples the actuator is an electric actuator. In such examples the actuator may be driven by either an electric motor or a hydraulic motor via a gearbox. In such examples a synchronising reduction gearbox may be provided to enable mechanical synchronisation between actuators and arranged so as to drive a ball screw which acts to drive the first actuating member and/or the second actuating member.

An actuator according to the present disclosure can provide two coaxial outputs of different strokes with a controlled mechanical sequencing. It will be appreciated by those skilled in the art that the sequence of the modes of operation of the actuator may differ. For example, in a set of examples the actuator is arranged to operate in the first mode and then subsequently in the second mode when opening the thrust reverser. Whereas, in an alternative set of examples, the actuator is arranged to operate in the second mode and then subsequently in the first mode when opening the thrust reverser. In both cases the actuator may operate the modes in reverse order when closing the thrust reverser. It will be appreciated by those skilled in the art that either of the sequences may be preceded or succeeded by a further different mode or one of the same first/second modes as discussed above. For example, the actuator may be arranged to operate in the first mode, then the second mode and then the first mode again or alternatively the second mode, then the first mode and then the second mode again.

The arrangement of the actuating members in the actuator and the presence of two distinct modes in which the actuating members move together in one mode, and one actuating member moves independently in the other mode, means that one of the actuating members must have a greater range of travel than the other. The actuating member that has the greatest range of travel will be the actuating member which is actuated in both modes. This actuating member therefore is able to move a total distance equal to the sum of the first predetermined distance and the second predetermined distance. The other actuating member, whichever this may be, will have the shortest range of travel; being actuated in only one of the modes.

As discussed above, one of the significant advantages of the present disclosure is that there is no need for electronic synchronisation between two separate actuating members in order to coordinate their output. In order to ensure accurate mechanical synchronisation the actuator according to the present disclosure may be provided with a drive source that has a single output. It is therefore preferable that the actuator comprises a drive source with a single output arranged to drive either the first actuating member or the second actuating member. This is advantageous as already discussed the actuating members are mechanically coupled to ensure their coupling and decoupling at the relevant positions and thus by providing a drive source with a single output the actuator is more robust. In such a set of examples the drive source may be arranged to drive solely the actuating member which is arranged to travel the greater distance. Furthermore, in such a set of examples the actuating member arranged to travel the greater distance is arranged so as to act upon and drive the other actuating member. As is mentioned above, the drive source may be electric or hydraulic.

The interlock arrangement which locks the first and second actuating members to enable them to move together in a first mode may be comprised of a host of different components. However, as discussed above it is preferable that the actuator remains relatively simple and requires minimal sequencing and thus in a set of examples the interlock arrangement comprises one or more moveable segments which act between the first actuating member and second actuating member so as to hold them together. Preferably the interlock arrangement comprises one or more moveable segments which act between the first actuating member and the second actuating member so as to mechanically couple the first and second actuating members together. It will be appreciated that such a set of examples is particularly advantageous as the actuating members are coupled together using a simple mechanical arrangement which preferably requires no electronic or hydraulic control logic.

In a further set of examples the one or more moveable segments are radially moveable. Such examples are beneficially particularly when combined with examples in which the actuating members are coaxial cylindrical members. Thus in at least some examples the first and second actuating members have a coaxial arrangement and the one or more moveable segments are radially moveable so as to act between the first actuating member and the second actuating member.

In such a set of examples the moveable segments may be provided around the inner circumference of the outer actuating member, preferably evenly distributed around the inner circumference.

In a further set of examples at least one of the first and second actuating members comprises one or more recesses arranged on an outwardly facing surface to receive the one or more moveable segments in the locked mode. A single recess, e.g. a substantially continuous groove, may be arranged to receive more than one of the moveable segments. This could assist with alignment of the interlock arrangement. For example, one or more recesses are provided on the actuating member which is innermost in such a coaxial arrangement, and arranged so that the moveable segments are able to move into the one or more recesses so as to lock the innermost actuating member and the outermost actuating member together.

Any number of moveable segments could be provided to lock the actuating members together. For example, the interlock arrangement may comprise between one and nine moveable segments arranged circumferentially around the coaxial arrangement. In at least some examples the interlock arrangement comprises three, six or nine moveable segments arranged circumferentially around the coaxial arrangement. Preferably the moveable segments are evenly distributed around the coaxial arrangement.

In a set of examples the moveable segments are able to move between two distinct positions, each of which corresponds to the locked mode and the unlocked mode. In the locked mode the moveable segments may be in a position in which each moveable segment spans between both the first actuating member and second actuating member. In the unlocked mode the moveable segments may be positioned such that each moveable segment does not span between the two actuating members.

The actuator may be arranged to accommodate the moveable segments when they are not received in the recesses in the locked mode. Accordingly the actuator may comprise a main body that surrounds the coaxial arrangement, wherein the main body comprises one or more slots arranged on an inwardly facing surface to receive the one or more moveable segments in the unlocked mode. Such slots provided in the main body of the actuator receive the moveable segments when they move away from coupling together the two actuating members. A single slot, e.g. a substantially continuous groove, may be arranged to receive more than one of the moveable segments. This could assist with alignment of the interlock arrangement.

In a further set of examples the one or more recesses comprise ramped edges arranged so as to encourage radial movement of the one or more moveable segments towards the one or more slots as the interlock arrangement is switched between the locked and unlocked modes. By providing ramped edges, as the actuating members are driven by the actuator, if significant resistance of motion is experienced by the actuating member with the ramped recesses, the other actuating member will apply a force to the moveable segments which will be encouraged out of the recesses and into the slots provided in the main body. At this point the actuating members will no longer be locked together and will be free to move independently.

In another set of examples the actuator may be provided with a hardstop. The hardstop may consist of any internal structure that prevents the actuating members from translating any further along the actuator. Preferably the actuator comprises a hardstop arranged to prevent either the first or second actuating member from moving further than the first predetermined distance. The position of the hardstop may, for example, coincide with the position of the slots in the main body and thus may provide a limiting point for one of the actuating members. At this point the moveable segments may be translated into the slots by the motion of the other actuating member. The position of the hardstop may therefore determine when the interlock arrangement is switched between the locked and unlocked modes.

It will be appreciated that the position of the interlock arrangement may determine the first and/or second predetermined distances. In at least some examples the axial position of the one or more moveable segments along one of the actuating members at least partially determines the first and/or second predetermined distance. In addition, or alternatively, in examples where one or more recesses are provided on one of the actuating members to allow the interlock arrangement to lock the members together, the position of the one or more recesses at least partially determines the first and/or second predetermined distance.

In some examples the actuator may comprise means for adjusting the position of the interlock arrangement relative to the first and/or second actuating members. In examples where the interlock arrangement comprises one or more moveable segments which act between the first actuating member and the second actuating member, the axial position of the one or more moveable segments along the first and/or second actuating member may be variable. In addition, or alternatively, in examples where the interlock arrangement comprises one or more recesses that receive the one or more moveable segments in the locked mode, the axial position of the one or more recesses along the first and/or second actuating member may be variable. For example, adjusting the position of the segments on the second actuating member and adjusting the position of the corresponding recesses on the first actuating member changes the amount that the first actuating member and second actuating member can be moved relative to one another in the unlocked mode.

Although the first and second predetermined distances may be approximately equal, preferably the one of the first and second predetermined distances is greater than the other. Accordingly two different stroke lengths may be provided by the actuator.

It is desirable that the thrust reverser assembly does not inadvertently become active and deploy as this would mean that reverse thrust would be provided during general operation of the gas turbine engine, for example whilst cruising, and this could cause problems for the aircraft. Therefore, in a set of examples the actuator further comprises a primary lock which prevents movement of either actuating member. The primary lock may be operated by a separate control circuit and drive such that it is independent from the main drive of the actuator. It will be appreciated by those skilled in the art that such an example is particularly advantageous as even in the case of a control failure of the main drive of the actuator it can be prevented from inadvertent deployment by the separate control circuit and primary lock. Alternatively the primary lock may also be controlled by the electric or hydraulic control which operates the rest of the actuator.

In a set of examples the first actuating member and/or the second actuating member are arranged to move linearly. This is advantageous as it can allow for a simple interlock arrangement between the first and second actuating members. Preferably the first actuating member and the second actuating member move linearly in parallel. As is mentioned above, the first and second actuating members may have a coaxial arrangement. In at least some examples the first actuating member comprises a cylindrical member and the second actuating member comprises a hollow cylindrical member which substantially surrounds the first actuating member. Both the first and second actuating members may comprise cylindrical hollow shells, which is beneficial as it means that various other components of the actuator can be accommodated inside one or both of the shells.

Further according to the present disclosure there is provided a thrust reverser for a gas turbine engine comprising a linear translating cowl structure contained within a nacelle surrounding the gas turbine engine, the linear translating cowl structure comprising a first sleeve and a second sleeve, and an actuator as described hereinabove, wherein the first actuating member moveable is arranged to translate the first sleeve, and the second actuating member is arranged to translate the second sleeve, between positions corresponding to the thrust reverser being open or closed. Preferably such a thrust reverser comprises four actuators arranged to translate the first and second sleeves between positions corresponding to the thrust reverser being open or closed. The gas turbine engine may be a turbofan engine.

In examples of such a thrust reverser, the first sleeve or the second sleeve may comprise one or more of: a translating cowl, a translating cascade, a blocker door, or any combination thereof.

It will be appreciated that the thrust reverser may comprise one or more further actuators operable to drive other components.

BRIEF DESCRIPTION OF DRAWINGS

One or more non-limiting examples will now be described, with reference to the accompanying drawings, in which.

DETAILED DESCRIPTION

Figure 1:
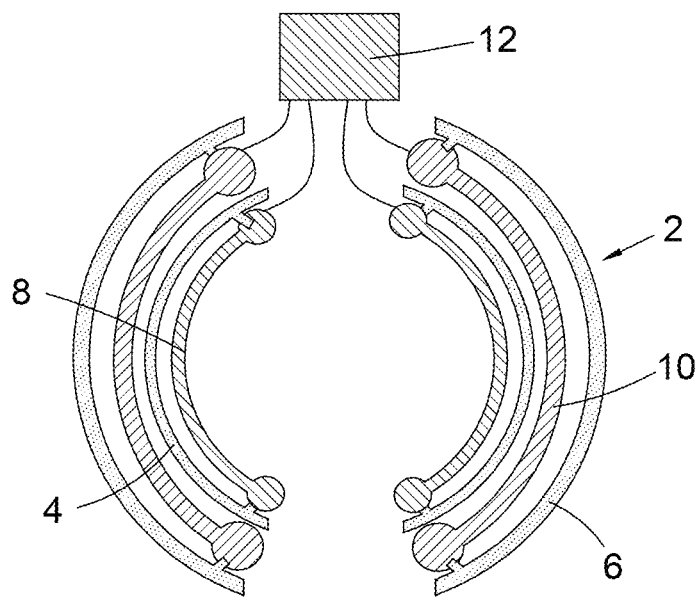
FIG. 1 shows a schematic overview of a typical thrust reverser actuation system arranged to drive two independent sleeves.

FIG. 1 shows a schematic representation of a thrust reverser actuation system 2 which comprises a first sleeve 4 and a second sleeve 6. In order to operate each of the sleeves 4, 6 a first actuation system 8 and second actuation system 10 are provided. The actuation systems 8, 10 are controlled by a common control unit 12. The actuation systems 8, 10 may be electric or hydraulic actuation systems.

Figure 2:
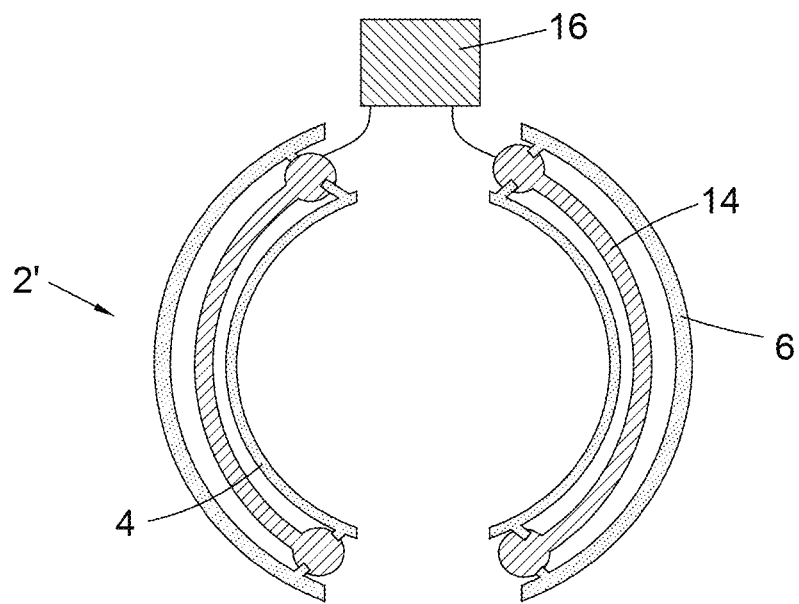
FIG. 2 shows a schematic overview of a trust reverser actuation system in accordance with the present disclosure arranged to drive two independent sleeves.

FIG. 2 shows a similar thrust reverser actuation system 2' driven by an actuator which is in accordance with the present disclosure. Instead of an independent actuation system being provided for each of the sleeves 4, 6, a single actuation system 14 is provided which is able to drive both sleeves 4, 6. The single actuation system 14 is controlled by a common control unit 16 which is able to control the way in which the sleeves 4, 6 are driven with respect to one another.

It will be appreciated that there are various architectures of a thrust reverser which comprises two translating sleeves and the specific architecture of the thrust reverser determines the type of action of the actuator which is needed to drive translation of the sleeves.

FIGS. 3-7 show the kinematics of a first architecture for a thrust reverser as it moves from a first position whereby no reverse thrust is provided to a final position in which reverse thrust is provided. This thrust reverser architecture is compatible with the actuator of the present disclosure.

Figure 3:
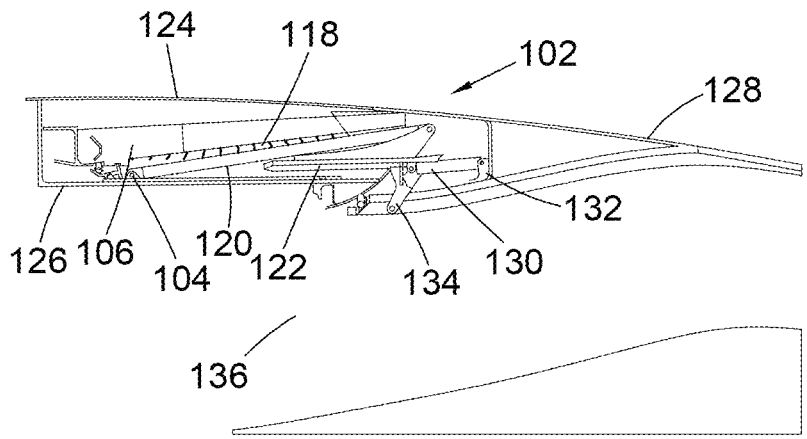
FIG. 3 shows a first exemplary thrust reverser architecture in a stowed position.

The thrust reverser architecture 102 seen in FIG. 3 comprises a first sleeve 104 (equivalent to a primary sleeve) and a cascade sleeve 106 (equivalent to a secondary sleeve). The cascade sleeve 106 comprises vanes 118 for directing airflow through the cascade sleeve 106 in order to provide reverse thrust. The primary sleeve 104 is operatively connected by a connection rod 120 to a blocker door 122. The cascade sleeve 106 and the blocker door 122 are contained within the nacelle structure between an outer wall 124 and inner wall 126. By stowing the cascade sleeve 106 and the blocker door 122 out of the air flow path of the engine, this helps to reduce drag during normal operation and thus improves engine efficiency.

The cascade sleeve 106 is fixedly connected to an outer shell 128 of the nacelle structure. The blocker door 122 is pivotally connected by an extending arm 130 to a first fixing point 132 on the shell 128 and is directly pivotally connected to a second fixing point 134.

In the position seen in FIG. 3 the thrust reverser is in a stowed configuration in which no reverse thrust is provided. In this configuration air which is propelled by the jet engine is free to flow through the air channel 136 towards the rear of the engine.

Figure 4:
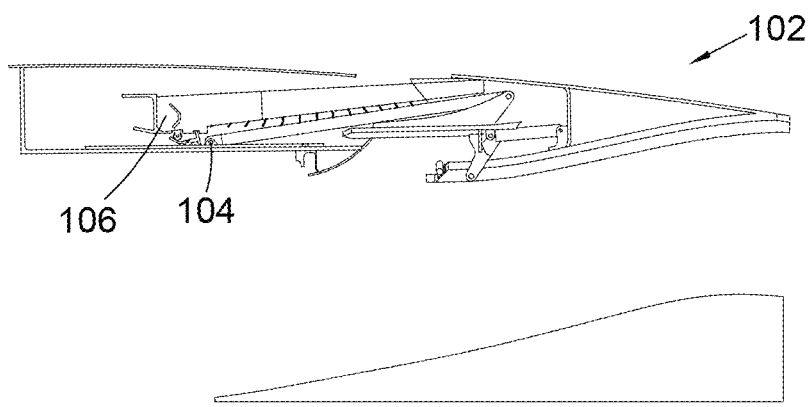
FIG. 4 shows the thrust reverser architecture of FIG. 3 in a partially deployed position wherein both the primary sleeve and cascade sleeve are translated.
Figure 5:
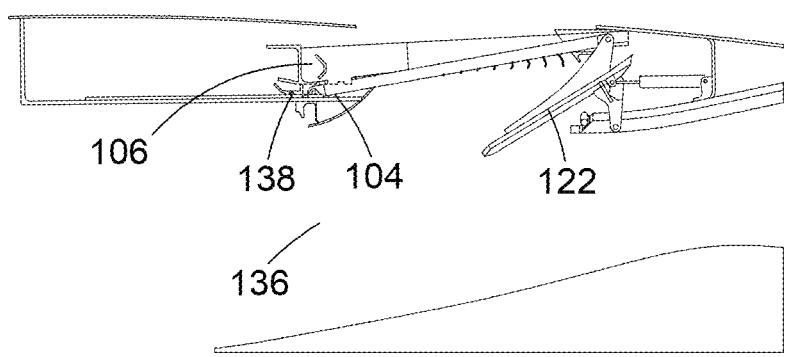
FIG. 5 shows the thrust reverser architecture of FIG. 3 in a further deployed position wherein the primary sleeve has reached its limiting position.

FIG. 4 illustrates a first stage in the transition towards providing reverse thrust. In this thrust reverser architecture 102 the primary sleeve 104 and cascade sleeve 106 initially move together, translating backwards i.e. in an aft direction. The primary sleeve 104 and cascade sleeve 106 continue to move together until they reach a predetermined position as seen in FIG. 5. Here it can be seen that the primary sleeve 104 reaches the end of its track 138 at which point it is unable to move any further. At this stage the blocker door 122 has begun to pivot downwards into the air channel 136.

Figure 6:
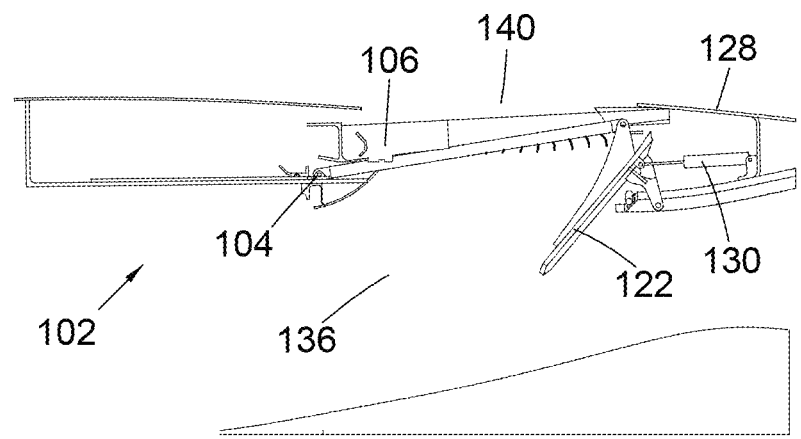
FIG. 6 shows the thrust reverser architecture of FIG. 3 wherein the primary sleeve remains stationary and the cascade sleeve is translated.
Figure 7:
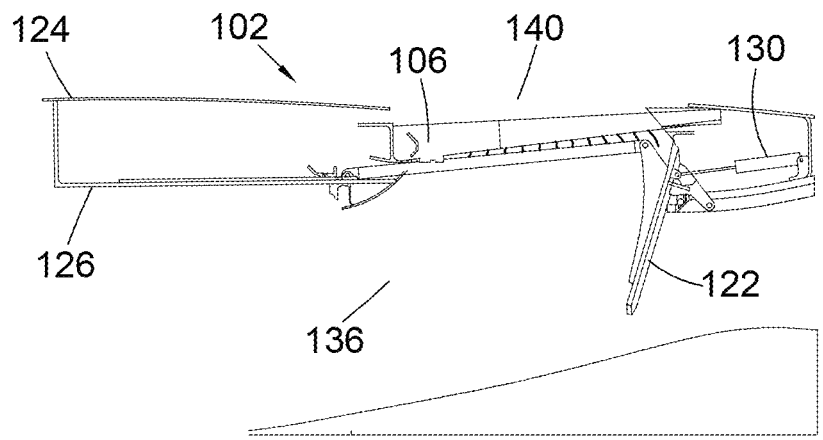
FIG. 7 shows the thrust reverser architecture of FIG. 3 in a fully deployed position wherein translation of the primary and cascade sleeves is arrested.

FIG. 6 illustrates how the primary sleeve 104 remains stationary and the cascade sleeve 106 continues to translate. It can be seen that the translation of the cascade sleeve 106 causes the outer shell 128 to retract and reveal an opening 140. This is the opening 140 through which air is able to pass out of the nacelle and provide reverse thrust. It can also be seen in this Figure how the blocker door 122 has begun to move further into the air flow path 136 which is enabled by the extending arm 130 extending to a longer length which allows the blocker door 122 to pivot radially inward. FIG. 7 shows the thrust reverser 102 in its end point at which full reverse thrust is provided. Here it can be seen that the cascade sleeve 106 has been fully translated such that the blocker door 122 is pivoted fully into the air channel 136 and the cascade sleeve 106 has moved fully out of the cavity in the nacelle provided by the outer wall 124 and inner wall 126.

In order to drive the thrust reverser architecture 102 seen in FIGS. 3-7 there is provided an actuator capable of first driving both the first (primary) sleeve 104 and cascade (secondary) sleeve 106 together and then solely driving the cascade (secondary) sleeve 106.

Figure 8:
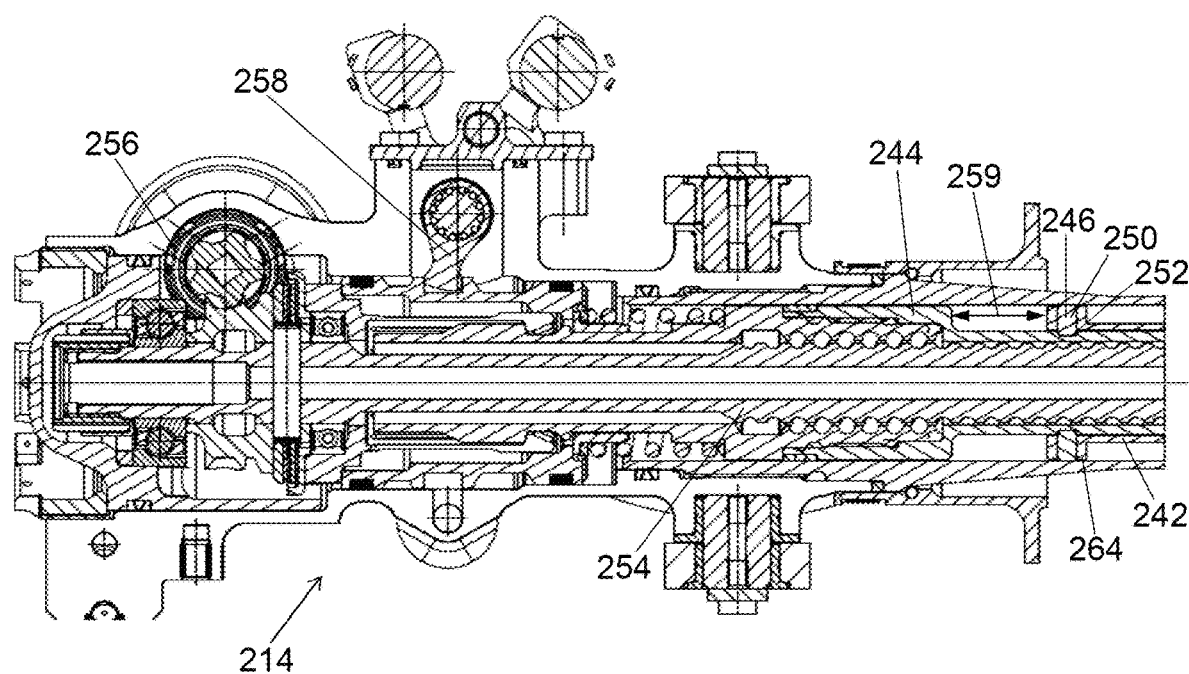
FIG. 8 illustrates the head end of an electric actuator in accordance with an example of the present disclosure wherein the actuating members are stowed.

This can be achieved using an electric actuator 214 as seen in FIG. 8. This Figure depicts the head end of the electric actuator 214. The actuator 214 comprises a primary actuating member 242 and a secondary actuating member 244. The primary actuating member 242 is arranged so as to drive the primary sleeve 104 and the secondary actuating member 244 is arranged to drive the cascade sleeve 106. During operation of the actuator 214 to open the thrust reverser, the primary actuating member 242 and secondary actuating member 244 move together initially in a first mode. This is achieved by an interlock arrangement that comprises interlock segments 246 which are present in a cavity 250 in the primary actuating member 242 and engage in recesses 252 in the secondary actuating member 244. The position of the recesses 252 ultimately determines the distance which the second actuating member 244 is able to move independently of the first actuating member 242 in a second mode of operation.

The secondary actuating member 244 is driven by a ball screw 254 which is driven by a synchronising reduction gearbox 256, which is driven by either an electric or hydraulic motor (not shown). A primary lock 258 is provided which prevents motion of the secondary actuating member 244 unless the primary lock 258 is released. The primary lock 258 may be driven by an electric motor, an electric solenoid or by hydraulic pressure. The arrow 259 represents the distance which the secondary actuating member 244 can move independently of the first actuating member 242 and is equivalent to the stroke of the secondary actuating member 244 minus the stroke of the primary actuating member 242.

FIG. 8 shows the actuator 214 in the stowed position which is equivalent to the thrust reverser being stowed.

Figure 9:
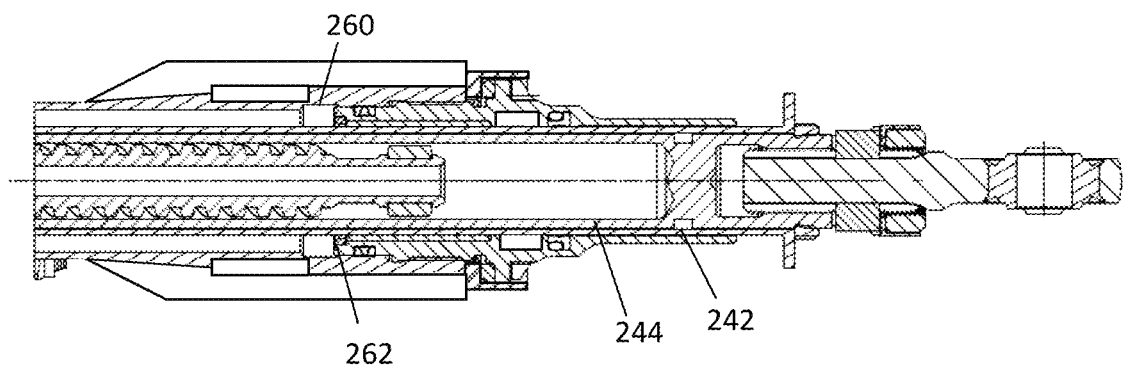
FIG. 9 illustrates the rod end of the actuator of FIG. 8 wherein the actuating members are stowed.

FIG. 9 illustrates the rod end of the actuator 214 also in the stowed position. A slot 260 is provided which allows the interlock segments 246 to be received and thus frees the primary actuating member 242 and secondary actuating member 244 from their interlock arrangement. Also visible is a hardstop 262 which prevents further motion of the primary actuating member 242 and secondary actuating member 244 when they come into contact with the hardstop 262.

During operation of the actuator 214 the electric (or hydraulic) motor drives the ball screw 254 which drives the secondary actuating member 244. Due to the interlock arrangement provided by the interlock segments 246, both the primary actuating member and secondary actuating member 244 move together in a first mode. They continue to move until the rim 264 of the primary actuating member 242 comes into contact with the hardstop 262. At this point the primary actuating member 242 can no longer move any further and the interlock segments 246 are free to be received in the slots 260. This point can be seen in FIG. 10. Movement of the interlock segments 246 is encouraged by the ramped e.g. chamfered edges 266 provided in the recesses 252. As the secondary sleeve 244 is acted on by the ball screw it pushes the interlock segments 246 and the chamfered edges 266 encourage the interlock segments 246 into the slots 260. Similar chamfered edges 268 are provided on the slots 260 to encourage motion of the interlock segments 246 when the actuating members 242, 244 are retracted.

At this point the primary actuating member 242 is in a locked translational position and the secondary actuating member 244 is freed from interlock with the primary actuating member 242 and is free to continue translational motion. The ball screw 254 continues to drive the secondary actuating member 244 until it abuts against the rim 264 of the primary actuating member 242 which abuts against the hardstop 262. At this point both the primary actuating member 242 and secondary actuating member 244 are fully deployed and when acting on the primary sleeve and secondary sleeve of the thrust reverser architecture seen in FIGS. 3-7 the thrust reverser will be fully deployed.

Of course it will be appreciated that the actuator need not be electric and FIGS. 12-15 illustrate a hydraulic actuator 314 which is equivalent to the electric actuator 214 seen in FIGS. 8-11. The components of the hydraulic actuator 314 are essentially the same and arrangement of the primary actuating member 342, secondary actuating member 344, interlock segments 346, recesses 352, slots 360 and hardstop 362 is essentially the same which results in the actuator 314 operating in an identical manner to that in FIGS. 8-11. The significant difference is that the reduction gearbox 256 is driven by hydraulic fluid and the reduction gearbox drives a synchronising screw 354 which drives the second actuating member 344.

Figure 10:
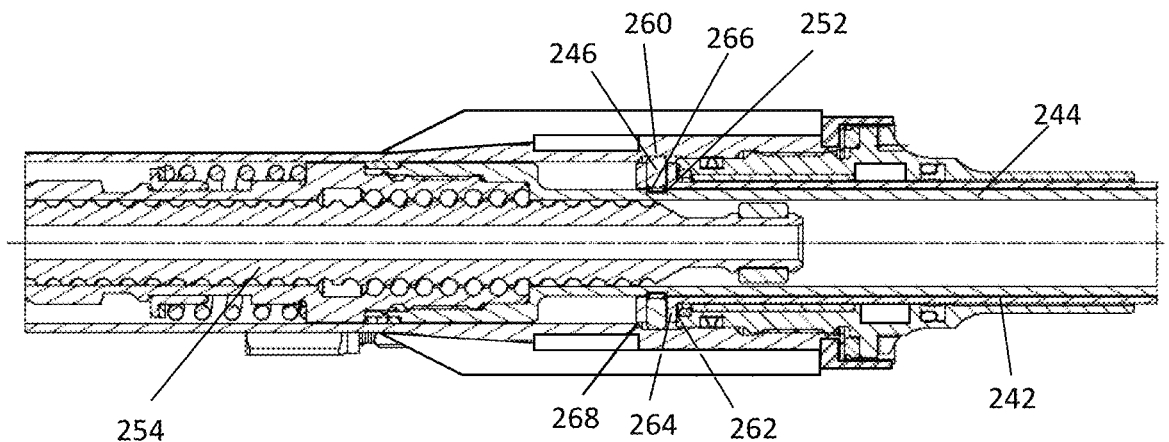
FIG. 10 illustrates the rod end of the actuator of FIG. 8 wherein the primary actuating member is fully deployed.
Figure 11:
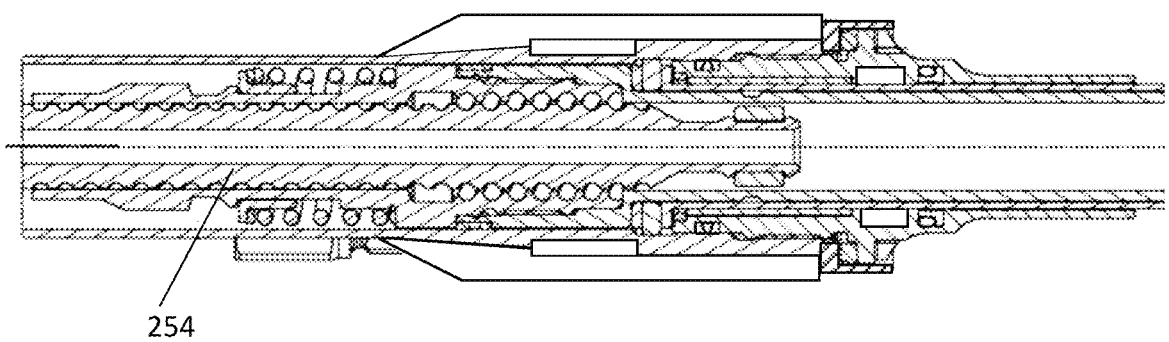
FIG. 11 illustrates the rod end of the actuator of FIG. 8 wherein the primary actuating member and secondary actuating member are fully deployed.
Figure 12:
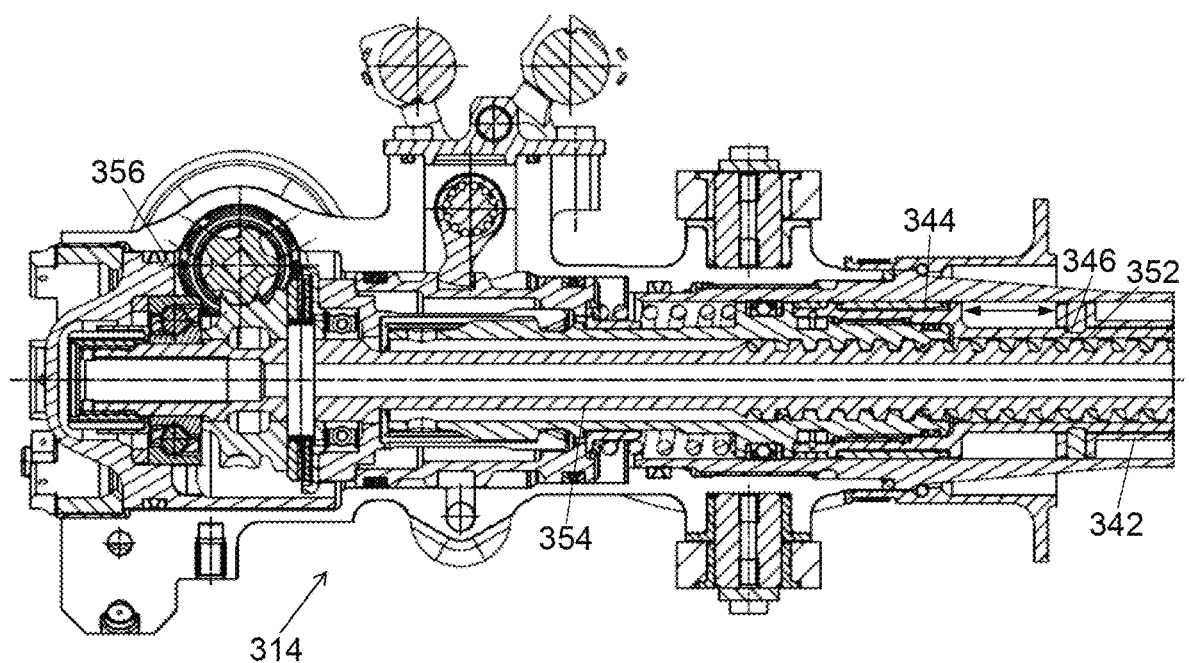
FIG. 12 shows the head end of a hydraulic actuator in accordance with an example of the present disclosure wherein the actuating members are stowed.
Figure 13:
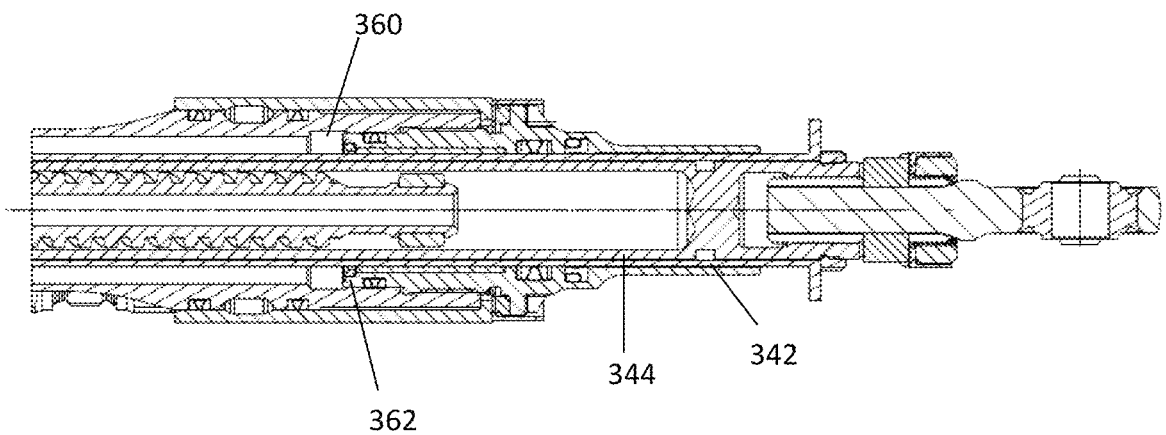
FIG. 13 shows the rod end of the hydraulic actuator of FIG. 12 when in the stowed position.
Figure 14:
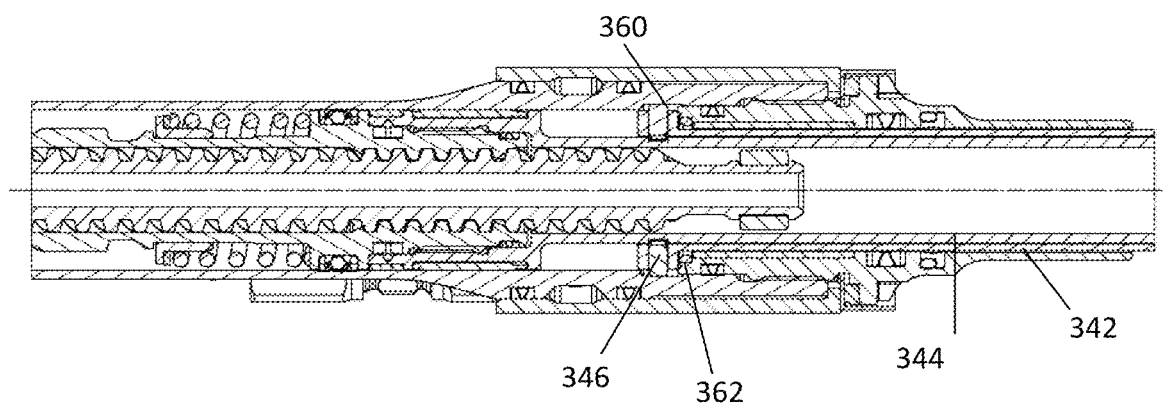
FIG. 14 shows the rod end of the hydraulic actuator seen in FIG. 12 when the primary actuating member is fully deployed.
Figure 15:
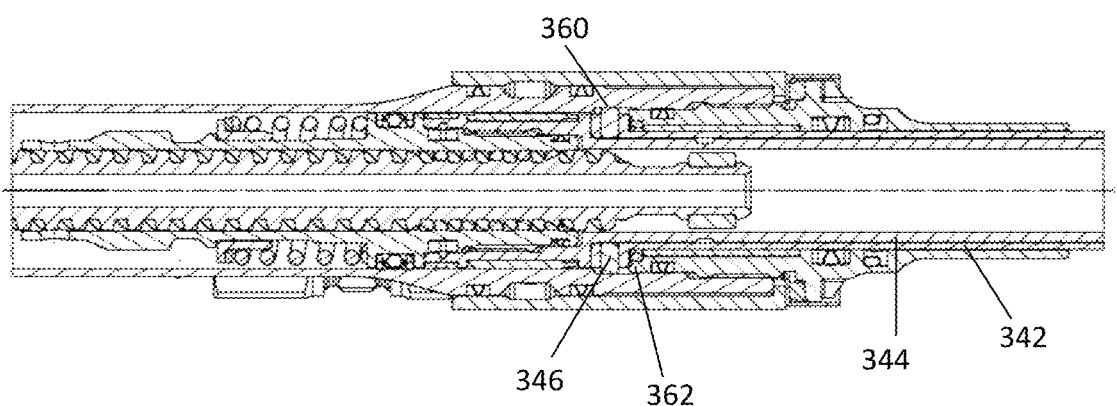
FIG. 15 shows the rod end of the hydraulic actuator seen in FIG. 12 when the primary and secondary actuating members are fully deployed.

FIGS. 13-15 illustrate the same positions of the actuating members 242, 244 as seen in FIGS. 9-11, the only difference being that a synchronising screw 354 is present.

Figure 16:
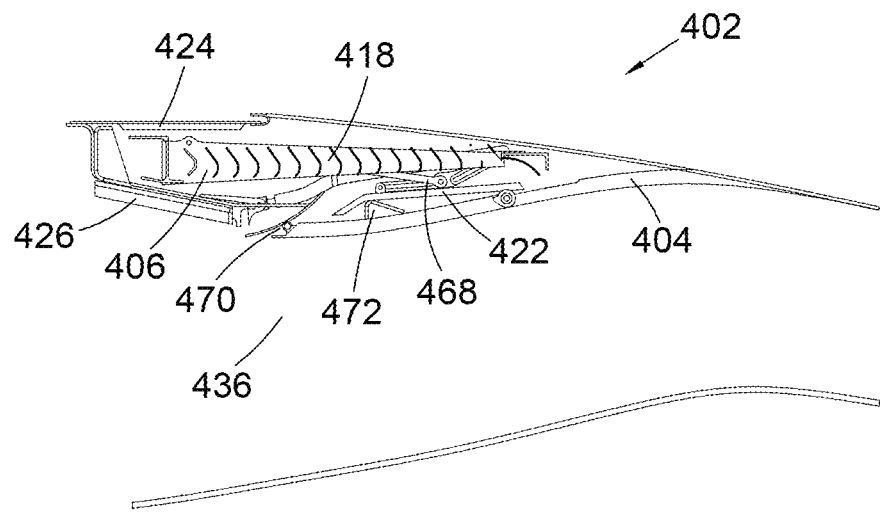
FIG. 16 shows a second exemplary thrust reverser architecture in a stowed position.

FIGS. 16-20 illustrate a second, alternative, thrust reverser architecture 402 in which a single sleeve moves on its own initially and is then joined by a secondary sleeve. The thrust reverser architecture 402 comprises a primary sleeve 404 and a cascade sleeve 406 (equivalent to a secondary sleeve). A blocker door 422 is connected via a linkage 468 to the cascade sleeve 406. A seal 470 seals the primary sleeve 404 to the inner wall 426 of the nacelle. FIG. 16 shows the thrust reverser architecture 402 in a stowed position. Here it can be seen that the cascade sleeve 406 along with the blocker door 422 and associated linkage 470 is contained within the walls of the primary sleeve 404 and the outer wall 424 and inner wall 426 of the nacelle. Similarly to the other thrust reverser architecture seen in FIGS. 3-7, the cascade sleeve 406 comprises vanes 418 to direct the air flow so as to produce a reverse thrust. The linkage 468 is also connected to the edge of the inner wall 426. A bumper 472 is fixed against the inner wall of the primary sleeve 404 and rests against the blocker door 422. When in the stowed position seen in FIG. 16 air can freely flow through the air channel 436 and provide forward thrust.

Figure 17:
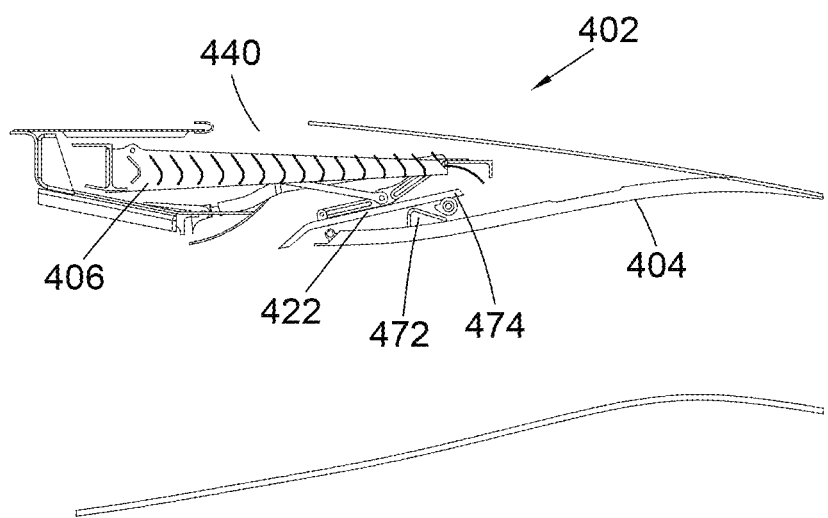
FIG. 17 shows the second thrust reverser architecture in a partially deployed position.

FIG. 17 shows the thrust reverser architecture 402 in a partially deployed position. Here it can be seen that the primary sleeve 404 has been driven backwards i.e. in an aft direction so as to begin to reveal an opening 440 in the outer wall of the nacelle. It can be seen that as the primary sleeve 404 has been brought backwards the bumper 472 is dragged along the length of the blocker door 422 towards its aft end 474. At this stage the secondary sleeve 406 remains stationary and has not yet been translated.

Figure 18:
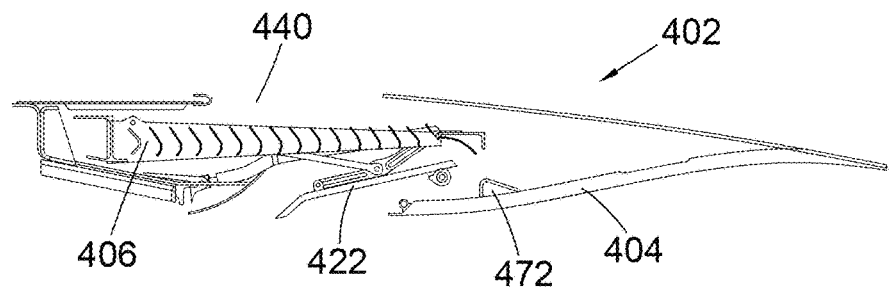
FIG. 18 shows the second thrust reverser architecture at the point where the primary sleeve has been translated and the secondary sleeve is about to be translated.

FIG. 18 depicts the thrust reverser architecture 402 at a further extended position whereby the primary sleeve 404 has been translated sufficiently that the bumper 472 is no longer in contact with the blocker door 422. This is also the transition point at which the cascade sleeve 406 begins translating with the primary sleeve 404.

Figure 19:
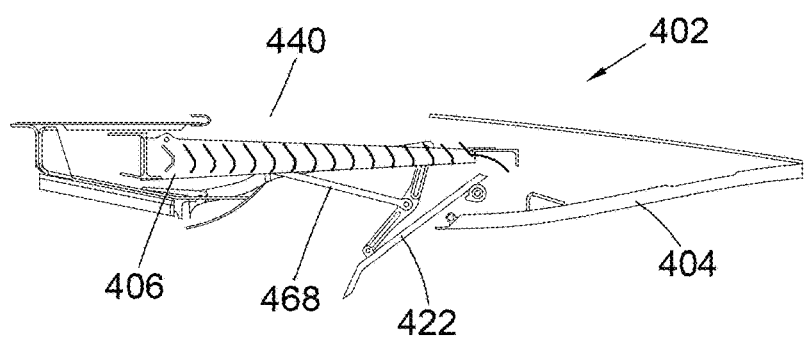
FIG. 19 shows the second thrust reverser architecture when both the primary sleeve and secondary sleeve have been translated together.

FIG. 19 shows how both the primary sleeve 404 and the cascade sleeve 406 are moved together so as to translate backwards. It can be seen that the opening 440 has been further increased, and as the cascade sleeve 406 is translated, due to its connection with the linkage 468 the blocker door 422 begins to pivot radially inward into the air channel 436.

Figure 20:
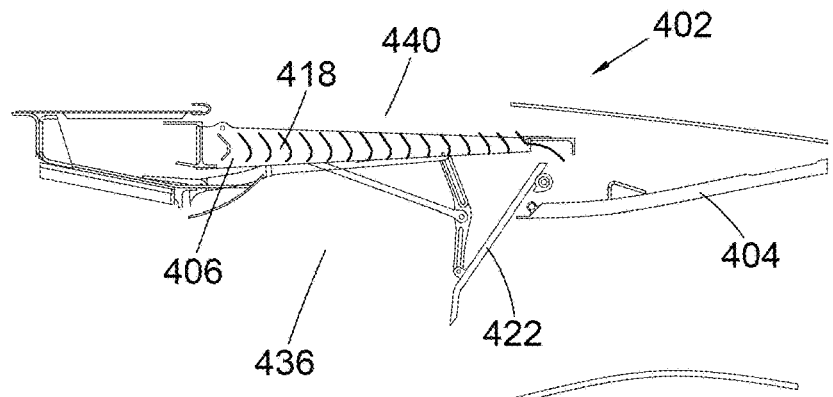
FIG. 20 shows the second thrust reverser architecture in the fully deployed position.

FIG. 20 shows the final position of the thrust reverser architecture 402 where full reverse thrust is provided. Here it can be seen that the primary sleeve 404 and secondary sleeve 406 have been fully translated and as a result the blocker door 422 is in its maximum position extending into the air channel 436. The opening 440 is also at its maximum position. In this configuration a portion of the air passing into the air channel 436 will be diverted by the blocker door 422 towards the cascade sleeve 406 which will direct the air via the vanes 418 out of the opening 440 to provide a reverse thrust.

In order to drive the second thrust reverser architecture 402 seen in FIGS. 16-20 using a single actuator there is provided an actuator arranged to first drive the primary sleeve 404 on its own and then drive the primary sleeve 404 and cascade sleeve 406 in unison together.

Figure 21:
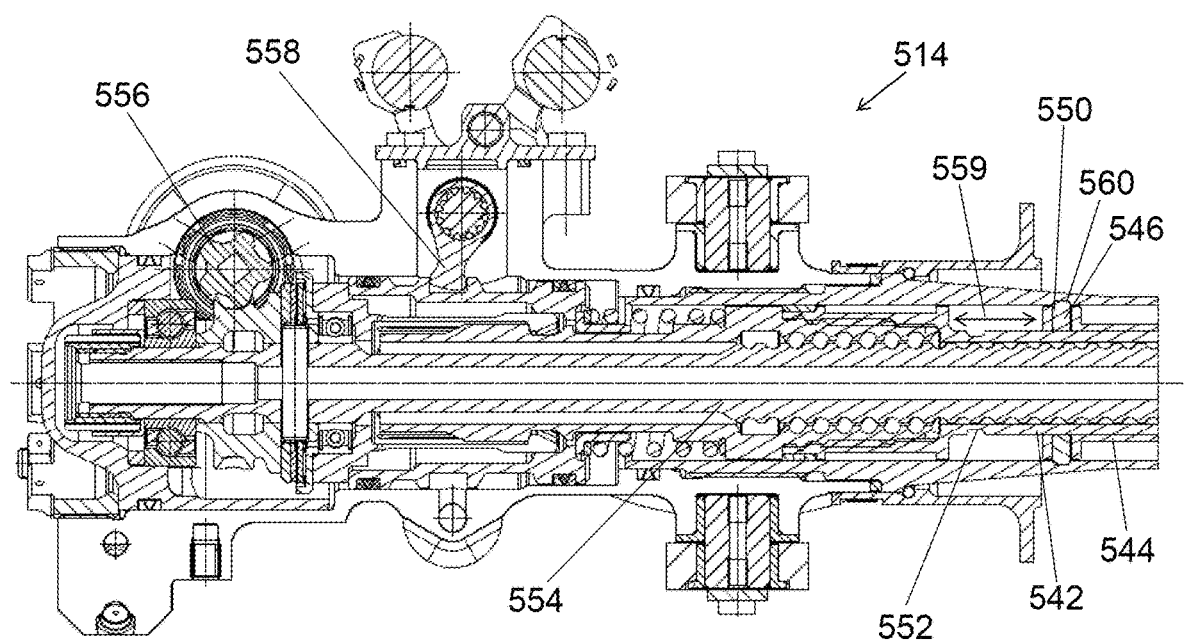
FIG. 21 shows an electric actuator in accordance with another example of the present disclosure in the stowed position.

This can be achieved using an electric actuator 514 as seen in FIG. 21. This Figure depicts the head end of the electric actuator 514. The actuator 514 comprises a primary actuating member 542 and a secondary actuating member 544. The primary actuating member 542 is arranged to drive the primary sleeve 404 and the secondary actuating member 544 is arranged to drive the cascade sleeve 406 (equivalent to a secondary sleeve). During operation of the actuator 514 to open the thrust reverser, the primary actuating member 542 is first moved on its own in a first mode. In this mode the secondary actuating member 544 is initially held in position by interlock segments 546 which are present in a cavity 550 in the secondary actuating member 544 and engage in slots 560 which are present in the outer body of the electric actuator 514. The position of the slots 560 ultimately determines the distance the primary actuating member 542 is able to move independently of the secondary actuating member 544 in the first mode of operation. Also seen in this Figure are recesses 552 provided on the primary actuating member 542, the recesses 552 are present to allow the interlock segments 546 to release from the slots 560 when the primary actuating member 542 reaches the secondary actuating member 544 at a point at which the recesses 552 align with the interlock segments 546.

The primary actuating member 544 is driven by a ball screw 554 which is driven by a synchronising reduction gearbox 556, which is driven by an electric motor (not shown). A primary lock 558 is provided which prevents motion of the primary actuating member 542 unless the primary lock 558 is released. The primary lock may be driven by an electric motor or an electric solenoid. The arrow 559 represents the distance which the primary actuating member 542 can move independently of the secondary actuating member 544 and is equivalent to the stroke of the primary actuating member 542 minus the stroke of the secondary actuating member 544.

FIG. 21 shows the actuator 514 in the stowed position which is equivalent to the thrust reverser being stowed.

Figure 22:
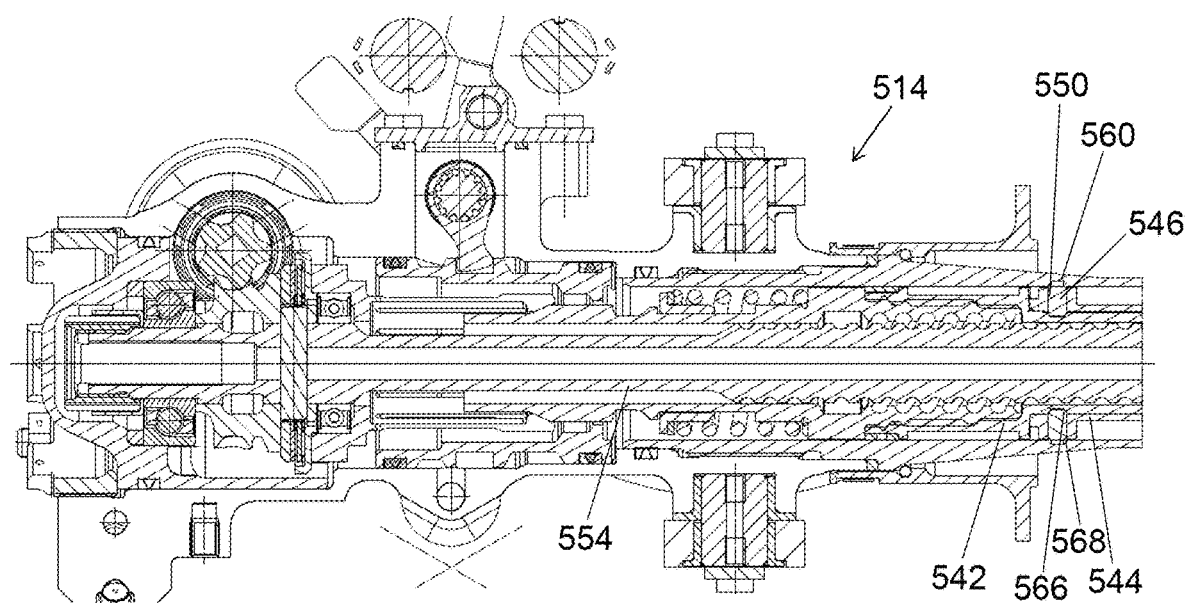
FIG. 22 shows the electric actuator seen in FIG. 21 when the primary actuating member has been deployed before the secondary actuating member.

FIG. 22 illustrates the head end of the actuator 514 in a partially deployed position at the stage the primary actuating member 542 has been driven by the ball screw 544 to a point at which the recesses 552 and the interlock segments 546 align. As seen in the Figure, at this point the interlock segments 546 release into the recesses 552 provided in the primary actuating member 542. The movement of the interlock segments 546 into this position engages the primary actuating member 542 and secondary actuating member 544 in a locked position so that any further movement of the primary actuating member 542 results in combined motion of both actuating members 542, 544. Movement of the interlock segments 546 is encouraged by the ramped e.g. chamfered edges 568 provided in the slots 560. As the primary actuating member 542 is acted on by the ball screw 554 it pushes the interlock segments 546 and the chamfered edges 568 encourage the interlock segments 546 into the recesses 552. Similar chamfered edges 566 are provided on the recesses and help to encourage motion of the interlock segments 546 when the actuating members 542, 544 are retracted.

Figure 23:
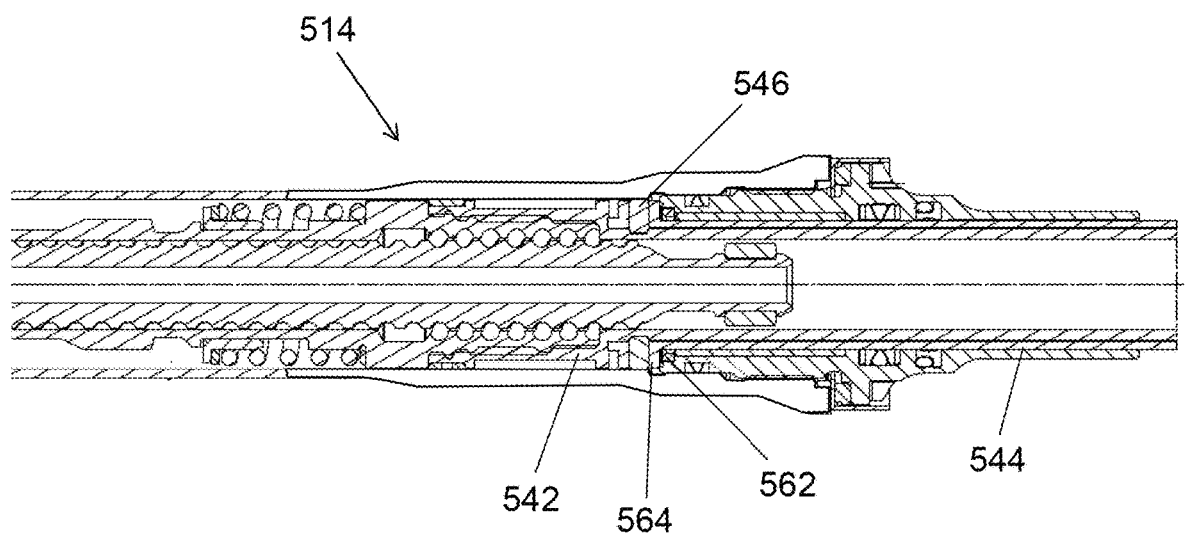
FIG. 23 shows the rod end of the electric actuator seen in FIG. 21 when the primary actuating member and secondary actuating member are fully deployed together.

FIG. 23 shows the actuator 514 in a fully deployed position. Here it can be seen that the primary actuating member 542 and secondary actuating member 544 have been driven along a distance at which a rim 564 on the secondary actuating member 544 abuts against a hardstop 562. At this point the secondary actuating member 544 cannot translate any further. Due to the interlock segments 546 which lock the first actuating member 542 to the second actuating member 544 the first actuating member 542 is also restricted from any further motion.

Figure 24:
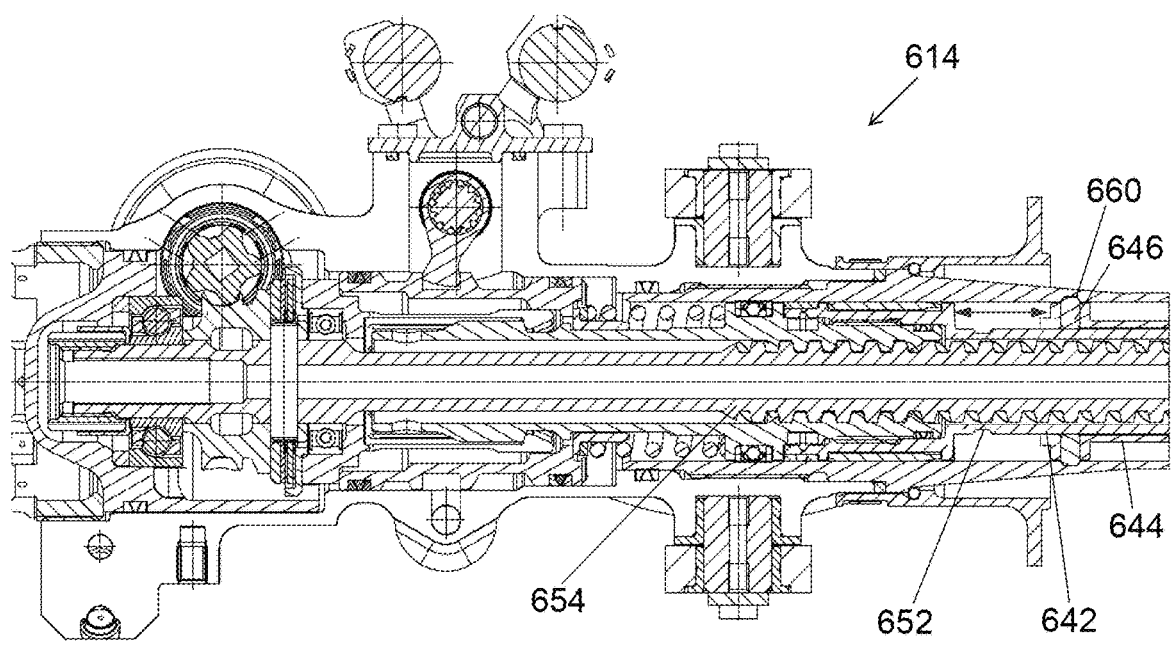
FIG. 24 shows the head end of a hydraulic actuator in accordance with another example of the present disclosure in the stowed position.
Figure 25:
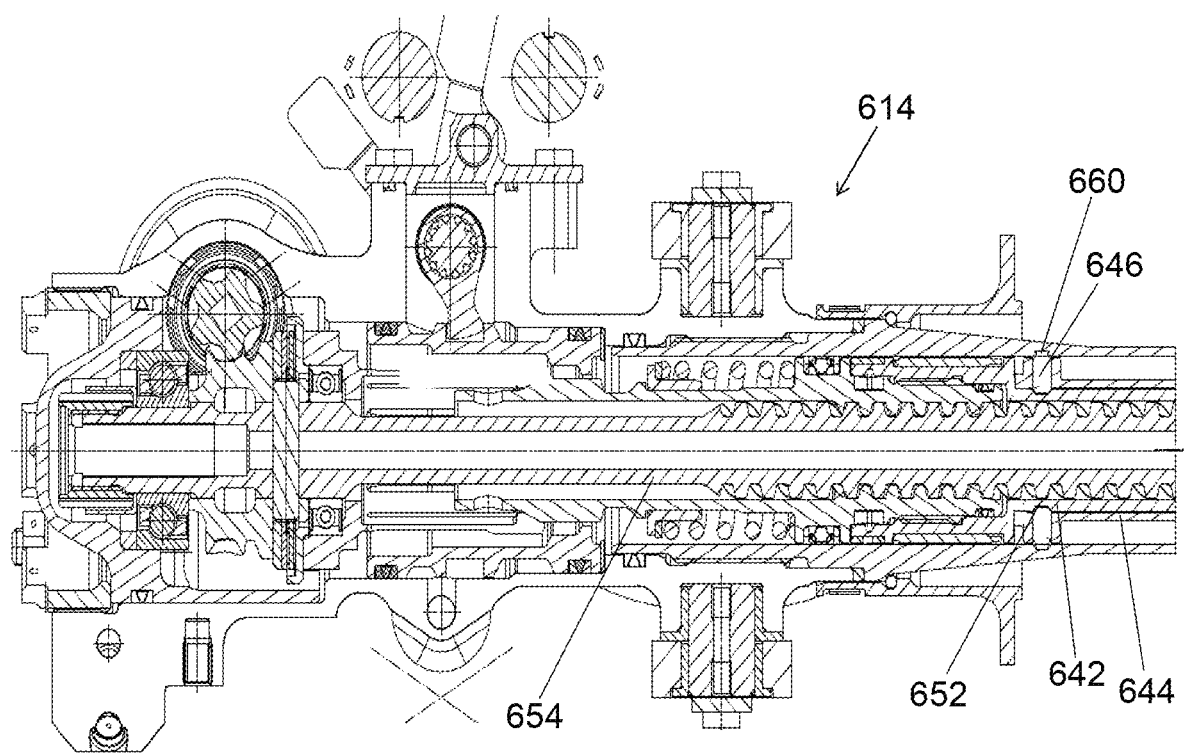
FIG. 25 shows the hydraulic actuator seen in FIG. 24 when the primary actuating member has been deployed before the secondary actuating member.
Figure 26:
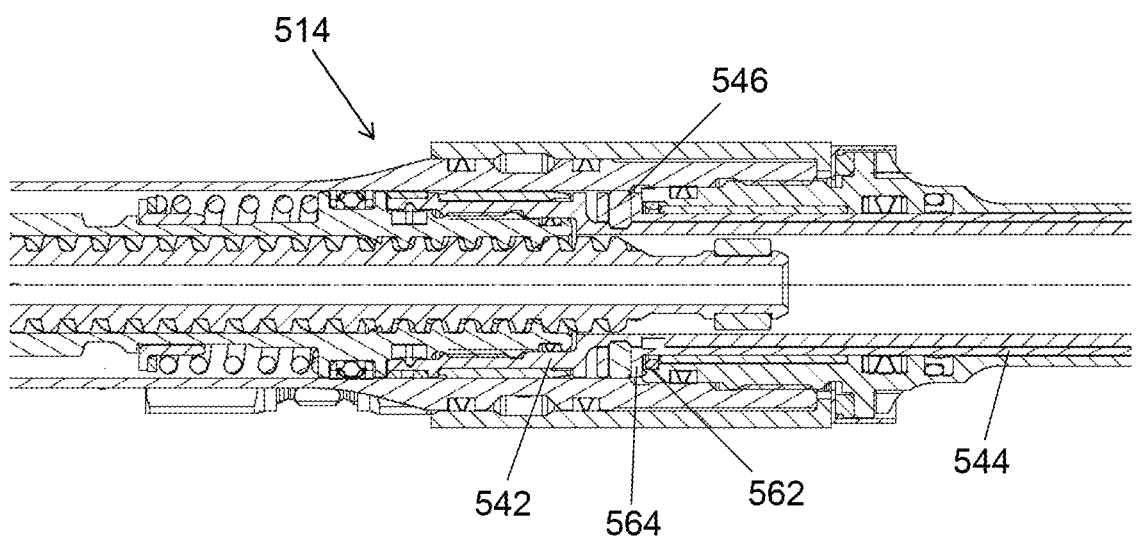
FIG. 26 shows the hydraulic actuator seen in FIG. 24 when the primary actuating member and secondary actuating member are fully deployed together.

Of course it will be appreciated that the actuator need not be electric and FIGS. 24-26 illustrate a hydraulic actuator 614 which is equivalent to the electric actuator 514 seen in FIGS. 21-23. The components of the hydraulic actuator 614 are essentially the same and the arrangement of the primary actuating member 642, secondary actuating member 644, interlock segments 646, recesses 652, slots 660, and hardstop 662 is essentially the same which results in the actuator 614 operating in an identical manner to that in FIGS. 21-23. The significant difference is that the reduction gearbox drives a synchronising screw 654 which drives the primary actuating member 642.

Whilst in the examples shown only a single set of slots and single set of recesses are provided, it will be appreciated by those skilled in the art that further slots and/or recesses may be provided to increase the number of modes of operation of the actuator. For example, in the examples seen in FIGS. 21-23 a further slot may be provided on the actuator body further towards the rod end of the actuator 514, specifically proximal to the position of the hardstop 562. In addition, the recess 552 may be repositioned further along the primary actuating member 542. This would mean that during operation the primary actuating member 542 would first advance to a point at which the recesses 552 align with the interlock segments 546 at which point the actuating members 542, 544 would become locked together. The actuator 514 may then drive both actuating members 542, 544 until a point at which the secondary actuating member 544 hits the hardstop 562. At this point, the interlock segments 546 may move out of the locking arrangement between the actuating members 542, 544 and slide into the further slot in the actuator body. This would then allow the primary actuating member 542 to move independently in a third mode. This is just one example of how an actuator with more than two modes of operation may be achieved.

The invention claimed is:

1. An actuator operable to drive a thrust reverser in a gas turbine engine, the thrust reverser comprising a linear translating cowl structure contained within a nacelle surrounding the gas turbine engine, the linear translating cowl structure comprising a first sleeve and a second sleeve;
   wherein the actuator comprises a first actuating member moveable along an axis so as to translate the first sleeve, and a second actuating member moveable along the axis so as to translate the second sleeve, between positions corresponding to the thrust reverser being open or closed;
   the actuator further comprising an interlock arrangement operable in a locked mode in which the first actuating member and second actuating member are locked so as to move together and in an unlocked mode in which at least one of the first actuating member and second actuating member is free to move independently of the other;
   wherein the first actuating member and second actuating member are further arranged such that operation of the actuator to open or close the thrust reverser comprises:
      a first mode wherein the interlock arrangement is in the locked mode and the first and second actuating members are driven to move together along a first predetermined distance; and
      a second mode wherein the interlock arrangement is in the unlocked mode and either the first actuating member or the second actuating member is driven to move along a second predetermined distance independently of the other actuating member;
   wherein an axial position of the interlock arrangement along one of the first and second actuating members determines the first predetermined distance.

2. The actuator of claim 1, comprising a drive source with a single output arranged to drive either the first actuating member or the second actuating member.

3. The actuator of claim 1, wherein the actuator is a hydraulic actuator or an electric actuator.

4. The actuator of claim 1, wherein the interlock arrangement comprises one or more moveable segments which act between the first actuating member and the second actuating member so as to mechanically couple the first and second actuating members together.

5. The actuator of claim 4, wherein the first and second actuating members have a coaxial arrangement and the one or more moveable segments are radially moveable so as to act between the first actuating member and the second actuating member.

6. The actuator of claim 5, wherein the one or more moveable segments comprises between one and nine moveable segments arranged circumferentially around the coaxial arrangement.

7. The actuator of claim 5, wherein at least one of the first and second actuating members comprises one or more recesses arranged on an outwardly facing surface to receive the one or more moveable segments in the locked mode.

8. The actuator of claim 7, comprising a main body that surrounds the coaxial arrangement, wherein the main body comprises one or more slots arranged on an inwardly facing surface to receive the one or more moveable segments in the unlocked mode, wherein the one or more recesses comprise ramped edges arranged so as to encourage radial movement of the one or more moveable segments towards the one or more slots as the interlock arrangement is switched between the locked and unlocked modes.

9. The actuator of claim 5, comprising a main body that surrounds the coaxial arrangement, wherein the main body comprises one or more slots arranged on an inwardly facing surface to receive the one or more moveable segments in the unlocked mode.

10. The actuator of claim 1, further comprising a hardstop arranged to prevent either the first or second actuating member from moving further than the first predetermined distance.

11. The actuator of claim 1, wherein the axial position of the interlock arrangement along one of the first and/or second actuating members is adjustable.

12. The actuator of claim 1, further comprising a primary lock which prevents movement of either actuating member.

13. The actuator of claim 1, wherein the axial position of the interlock arrangement along one of the first and second actuating members determines the second predetermined distance.

14. A thrust reverser for a gas turbine engine comprising a linear translating cowl structure contained within a nacelle surrounding the gas turbine engine, the linear translating cowl structure comprising a first sleeve and a second sleeve, and an actuator,
   wherein the actuator comprises a first actuating member moveable along an axis so as to translate the first sleeve, and a second actuating member moveable along the axis so as to translate the second sleeve, between positions corresponding to the thrust reverser being open or closed;
   the actuator further comprising an interlock arrangement operable in a locked mode in which the first actuating member and second actuating member are locked so as to move together and in an unlocked mode in which at least one of the first actuating member and second actuating member is free to move independently of the other;
   wherein the first actuating member and second actuating member are further arranged such that operation of the actuator to open or close the thrust reverser comprises:
   a first mode wherein the interlock arrangement is in the locked mode and the first and second actuating members are driven to move together along a first predetermined distance; and
   a second mode wherein the interlock arrangement is in the unlocked mode and either the first actuating member or the second actuating member is driven to move along a second predetermined distance independently of the other actuating member;
   wherein an axial position of the interlock arrangement along one of the first and second actuating members determines the first predetermined distance.

15. The thrust reverser of claim 14, comprising three further actuators, wherein the actuator and the three further actuators are arranged to translate the first and second sleeves between positions corresponding to the thrust reverser being open or closed.

16. The thrust reverser of claim 14, wherein the axial position of the interlock arrangement along one of the first and second actuating members determines the second predetermined distance.

* * * * *